United States Patent [19]

Rousseau

[11] Patent Number: 4,508,762

[45] Date of Patent: Apr. 2, 1985

[54] PROCESS FOR MANUFACTURING A HIGH-PERFORMANCE THERMAL PERFORMANCE MATERIAL

[75] Inventor: Gérard Rousseau, Gironde, France

[73] Assignee: Societe Nationale Industrielle Aerospatiale, Paris, France

[21] Appl. No.: 490,039

[22] Filed: Apr. 29, 1983

[30] Foreign Application Priority Data

Apr. 29, 1982 [FR] France ................ 82 07415

[51] Int. Cl.$^3$ .............. B05D 3/02; B05D 3/12; B29C 25/00
[52] U.S. Cl. ................... 427/228; 264/29.5; 427/350; 427/379
[58] Field of Search .......... 427/228, 350, 379; 264/29.5

[56] References Cited

U.S. PATENT DOCUMENTS 4,215,161 7/1980 Seibold et al. ............ 427/228
4,366,191 12/1982 Gistinger et al. ............ 427/228

FOREIGN PATENT DOCUMENTS 0009940 9/1979 European Pat. Off. .
2613413 3/1976 Fed. Rep. of Germany .
2081899 3/1971 France .
2461690 7/1979 France .

Primary Examiner—Michael R. Lusignan
Attorney, Agent, or Firm—Armstrong, Nikaido, Marmelstein & Kubovcik

[57] ABSTRACT

The present invention relates to a process for manufacturing thermal protection material or piece. According to the process of the invention, a first solution is prepared, comprising a dispersant agent non-solvent of the resin, an emulsifying agent in which said fibers are suspended, and a second solution comprising said liquid resin selected from the thermostable and thermosetting resins having a fixed carbon content greater than 45% by weight, an emulsifying agent identical to that used in the first solution, a solvent of the resin and a dispersant medium identical to that used in the first solution and miscible with said solvent, the first and the second solution are mixed until a homogeneous liquid phase is obtained, the material or the piece is formed, drained, dried and hardened by an appropriate baking.

Application of the protection material thus obtained for the equipment of a missile propellant stage.

14 Claims, No Drawings

PROCESS FOR MANUFACTURING A HIGH-PERFORMANCE THERMAL PERFORMANCE MATERIAL

The present invention relates to a process for manufacturing a high-performance thermal protection material, and to the material thus obtained.

It is known for certain specific applications, particularly for the equipment of a propellant stage of a missile such as a space rocket, to provide certain elements of the rear part of this stage, with a view to thermal protection thereof, with a protective material generally constituted by shaped pieces made from a substrate of low density in inorganic fibres or carbon fibres, rigidified by an organic binding agent, such as resins possibly associated with inorganic binding agents.

This protective material must be capable of supporting high thermal shocks which may be of the order of 3000° C. or temperatures of the order of 1000° C. or more, for several hours. The characteristics of the material obtained are essentially a function of the nature of the fibres used and the treatments that they undergo.

It has already been proposed in the prior art to make this type of material by means, in particular, of the technique of moulding by suction of fibres suspended in a bath. According to a first embodiment, the bath comprises an inorganic binding agent, an organic binding agent and a dispersion of powdered resin. The mixture obtained is heterogeneous and the resin is not distributed uniformly therein. This material does not present a reliability compatible with the assemblies to be made on craft on the one hand and on the other hand the heterogeneous structure which is slack due to a poor distribution of the fibres and the binding agents, is detrimental to the mechanical and thermal holding of these pieces. Finally, this technique is not applied to the electrically conducting fibres such as for example fibres of carbon and/or of silicon carbide as there is flocculation of the bath.

According to this same known method, a material may be made, formed by inorganic fibres rigidified by at least one inorganic binding agent and one organic binding agent, this material then being immersed in a reinforcing resin. However, this process presents certain drawbacks: in particular, it necessitates a fairly long cycle of manufacture. In addition, this technique cannot be applied to the fibres of carbon, silicon carbide and more generally to the electrically conducting fibres, due to the appearance of a flocculation of the bath.

Finally, a thermal protection material is known, constituted by asbestos or silica fibres mixed with a glue and projected onto the object to be protected. This type of material may withstand high temperatures, but the heterogeneity of the screen formed and its unequal distribution on the object to be protected have an unfavourable influence on its reliability.

The present invention has for an object to propose a process for manufacturing a thermal protection material not presenting the drawbacks of the processes of the prior art and making it possible to obtain a thermal protection material adapted to withstand very considerable thermal shocks which may be of the order of 3000° C. and/or to withstand high temperatures which may be of the order of 1000° C. for about ten hours.

Another object of the invention is to propose a process for manufacturing a thermal protection material, which may be carried out in one operation and constituted by inorganic and/or organic fibres bonded by an appropriate resin which is subsequently hardened and possibly pyrolyzed, said fibres subsequently being coated with a coating product, followed by a heat treatment.

Another object of the present invention is to propose a process for preparing a thermal protection material making it possible to obtain a material of perfect homogeneity, presenting a regular distribution of the fibres in the material.

Another object of the invention is to propose a process for preparing a thermal protection material according to which electrically conducting fibres such as fibres of carbon or silicon carbide may be used.

These and other purposes are attained by the present invention which in fact relates to a process for manufacturing a thermal protection material or a thermal protection piece capable of withstanding very considerable thermal shocks as well as very high temperatures, which may be of the order of 1000° C. for about ten hours, comprising a substrate formed by inorganic and/or organic fibres rigidified by a reinforcing resin, according to which a first solution is prepared, comprising a dispersant agent non-solvent of the resin, an emulsifying agent, in which said fibres are suspended, and a second solution comprising said liquid resin selected from the thermostable and thermosetting resins having a determined carbon content higher than 45% by weight, an emulsifying agent identical to that used in the first solution, a solvent of the resin and a dispersant medium identical to that used in the first solution and miscible with said solvent, the first and the second solutions are mixed until a homogeneous liquid phase is obtained, this phase is maintained homogeneous for the time necessary for the droplets of liquid resin in suspension in this phase to collect together slowly and form on the fibres a film of resin, the material or the piece is formed, drained, dried and hardened by an appropriate baking, and, in addition, all the following operations consisting in a pyrolysis of the resin of the material, then a coating of said fibres by a coating product, followed by a heat treatment, are further effected at least once on the baked material.

As fibres, use may advantageously be made of fibres whose diameter is between 2 and 15 microns and whose length is between about 300 and 1500 microns.

More particularly suitable fibres are fibres of carbon, graphite, silicon carbide, mullite, alumina, silica, glass, boron nitride, zirconia, and aromatic polyamides such as "Nextel" and "Kevlar".

The dispersant medium is preferably water or an organic solvent selected from the aliphatic ketones, the aliphatic alcohols and the halogenated solvents.

The emulsifying agent is preferably selected from the aliphatic polyalcohols, the ethers of polyalcohols, the aryl- or alkylsulfonic acids, the alkaline polyphosphates and the alkaline metaphosphates.

The liquid resin is preferably a formophenolic resin of the resol type in particular a formophenolic resin presenting a dry extract by weight of between 65 and 90%.

Other types of resins presenting similar properties may also be used, such as resins selected for example from the polyimides, the polystyryl-pyridines and polybenzimidazoles.

When the first and second solutions are mixed and maintained in homogeneous phase, the liquid resin dispersed in the form of fine droplets is fixed on the fibres and impregnates them without their being able to agglomerate even in the event of fibres of carbon, graphite or silicon carbide being used.

The protection material or piece is preferably formed by the technique of suction moulding. The material obtained is constituted by a homogeneous assembly of fibres impregnated with resin. The resin coating the fibres creates bonds at all the points of contact of the fibres with each other. The material is drained then dried at low temperature which is generally between 20° C. and 60° C. for a formo-phenolic resin with a view to facilitating elimination of the dispersant medium.

The above-mentioned baking of the material is effected with a view to polymerizing the resin preferably in a ventilated stove at a temperature which depends on the choice of the resin and which is at about 170° C. for a formo-phenolic resin.

All the operations consisting in a pyrolysis of the resin of the material, then a coating of the fibres of the material by a coating product, followed by a heat treatment, make it possible very substantially to improve the mechanical and thermal characteristics of the material.

Pyrolysis of the resin enabling this resin to be converted into carbon is effected in a neutral atmosphere at a temperature of between about 700° C. and 2700° C. as a function of the material treated.

In the event of it being desired to improve the thermal and especially the mechanical characteristics of the material in a non-oxidizing medium, the coating product may be a resin, a pitch or a pyrolytic carbon. If a resin is used, the material is impregnated by resin then the heat treatment consists in a baking for polymerization followed by a pyrolysis of this resin. In the case of using a pitch, the heat treatment consists simply in a pyrolysis.

In the case of the coating product being pyrolytic carbon, the latter is applied directly on the material by chemical deposit in vapour phase and the heat treatment of this pyrolytic carbon possibly consists in a graphitization.

In the event of it being desired to improve the mechanical and thermal characteristics of the substrate in an oxidizing medium, impregnation of said substrate is effected by immersion in a precursor of ceramic material or in a solution of this precursor. As precursor, use may be made of an organometallic compound of silicon, titanium, zirconium, aluminium, chromium, boron or hafnium. Drying is then effected to eliminate the solvents from the solution. Polymerization is carried out, then pyrolysis in a neutral atmosphere at temperatures higher than 800° C. which may go up to 2700° C.

The material obtained by the process of the invention can be used either as thermal protection piece or as support for the manufacture of tiles for constituting a thermal screen, particularly for space craft.

The reinforcement treatment may be repeated a certain number of times as a function of the result to be obtained.

Other advantages and characteristics of the invention will appear on reading the following example given by way of non-limiting example.

EXAMPLE 1

A low density thermal protection material is made from fibres of carbon reinforced by formo-phenolic resin. To make this material, 1600 g of fibres of carbon, whose diameter is between 2 and 10 microns, finely chopped so as to obtain fibres having a mean length of 600μ±300μ, are used.

These chopped fibres are mixed in about 50 liters of water and 2 liters of ethylene-glycol. Then, in 50 liters of water, a suspension is made, comprising 1500 g of formo-phenolic resin of resol type, 4 liters of ethyl alcohol and 2 liters of ethylene glycol. The two solutions are mixed and the suspension obtained is maintained under slight stirring for the resin to impregnate the fibres thoroughly.

The suction equipment for moulding the pieces is immersed in this bath, namely a filtering sieve covering a thin perforated structure, in form, connected to the depression vessel. The pieces are dried in a ventilated stove at 60° C. for 12 hours to allow all the solvents to be eliminated. The pieces are then baked. The baking cycle is composed of a period of 12 hours at 80° C., then 12 hours at 170° C.

The material obtained has the following characteristics:
 density about 0.20
 porosity about 80%
 % of resin: about 20% by weight
 flexural strength of the order of 4 MPa
 compressive strength of the order of 11 MPa.

This material then undergoes a second series of heat treatments. It is pyrolyzed at 800° C. in a neutral atmosphere for 4 hours.

The carbon felt obtained is impregnated by a polycarbosilane resin, precursor of silicon carbide, in 25% by weight solution.

The felt is drained then dried in vacuo for 5 hours at 100° C.

It is then polymerized in a neutral atmosphere at 200° C. for 4 hours, then pyrolyzed at about 1200° C. for 1 hour, which converts the polycarbosilane into silicon carbide.

The material obtained has the following characteristics:
 density: 0.30
 % of silicon carbide by weight: 40%
 flexural strength of the order of 6 MPa
 compressive strength of the order of 11 MPa To test this material, a plasma gun test is carried out, this material being subjected to 10 000 kw per m², the ablation, i.e. the thickness of material destroyed per second, is measured.

In an oxidizing atmosphere, the ablation is less than 0.2 mm per second.

In a neutral atmosphere, the ablation is less than 0.1 mm per second.

An identical test is carried out on the non-reinforced material obtained further to the first phase of production. It gives the following results:
 in a neutral atmosphere: ablation of about 0.1 mm per second,
 in an oxidizing atmosphere: ablation of about 3 mm per second.

I claim:

1. A process for manufacturing a thermal protection material capable of withstanding thermal shocks and very high temperatures up to 1000° C. for 10 hours, which comprises:
 (1) forming a highly porous substrate comprising at least one of inorganic and organic fibers rigidified by a reinforcing resin selected from the group of thermostable and thermosetting resins having a carbon content higher than 45% by weight, by the steps of:

(a) preparing a first solution of a suspension of said fibers comprising a dispersant agent non-solvent of said resin and an emulsifying agent, (b) preparing a second solution comprising a liquid form of said resin, said emulsifying agent, a solvent of said resin, said dispersant agent which is miscible with said solvent, (c) mixing said first and second solutions until a homogeneous liquid phase is obtained, (d) maintaining said phase for a period of time necessary so that the droplets of said resin collect and form on said fibers, thereby forming a film of said resin thereon, (e) draining, drying and hardening the resulting material so as to form said substrate, and (2) subjecting said substrate, at least once, to the steps of pyrolyzing, coating and heating.

2. A process according to claim 1, wherein said fibers have a diameter between 2 and 15 microns and a length between about 300 and 1500 microns.

3. A process according to claim 1, wherein said dispersant medium is selected from the group consisting of water, an aliphatic ketone, an aliphatic alcohol and a halogenated organic solvent.

4. A process according to claim 1, wherein said emulsifying agent is selected from the group consisting of an aliphatic polyalcohol, an ether of polyalcohol, an aryl- or alkylsufonic acid, an alkaline polyphosphate and an alkaline metaphosphate.

5. A process according to claim 1, wherein said resin is a form-phenolic resin of resol type.

6. A process according to claim 2, wherein said fibers are selected from the group consisting of carbon, graphite, silicon carbide, mullite, alumina, silica, glass, boron nitride, zirconia, and aromatic polyamide.

7. A process according to claim 1, wherein said resin is used for said coating.

8. A process according to claim 1, wherein a resin is used for said coating and said heating step is a baking followed by a pyrolysis effected in a neutral atmosphere at a temperature of between about 700° and 2700° C.

9. A process according to claim 1, wherein pitch is used for said coating and said heating step is a pyrolysis.

10. A process according to claim 1, wherein said coating step is depositing a pyrolytic carbon on said substrate by chemical deposition in vapor phase.

11. A process according to claim 1, wherein said coating provides a precursor of ceramic material which is polymerized by baking followed by pyrolysis in a neutral atmosphere.

12. A process according to claim 11, wherein said precursor of the ceramic material is selected from the group consisting of an organometallic compound of silicon, titanium, zirconium, aluminium, chromium, boron, hafnium and nitrogen.

13. A process according to claim 10, wherein said pyrolytic carbon deposition is followed by graphitization.

14. A process according to claim 1, wherein said substrate has a porosity of about 80%.

* * * * *